(12) United States Patent
Singh et al.

(10) Patent No.: US 6,384,978 B1
(45) Date of Patent: May 7, 2002

(54) TEMPERATURE-COMPENSATED OPTICAL FILTER ASSEMBLIES AND RELATED METHODS

(75) Inventors: Harmeet Singh; Michael S. Beard, both of Baco Raton, FL (US)

(73) Assignee: Qtera Corporation, Boca Raton, FL (US)

( * ) Notice: Subject to any disclaimer, the term of this patent is extended or adjusted under 35 U.S.C. 154(b) by 0 days.

(21) Appl. No.: 09/272,112

(22) Filed: Mar. 19, 1999

(51) Int. Cl.$^7$ .............................................. G02B 27/00
(52) U.S. Cl. ...................... 359/578; 359/577; 359/589; 356/454
(58) Field of Search ................................ 354/577, 578, 354/579, 114, 124, 127; 385/24; 356/454, 506; 359/580, 589

(56) References Cited

U.S. PATENT DOCUMENTS

| | | | |
|---|---|---|---|
| 3,681,608 A | * 8/1972 | Derderian et al. | 250/217 R |
| 4,547,729 A | * 10/1985 | Adolfsson et al. | 324/96 |
| 4,813,756 A | * 3/1989 | Frenkel et al. | |
| 4,883,062 A | 11/1989 | Nicholson | |
| 5,005,935 A | 4/1991 | Kunikane et al. | |
| 5,504,608 A | 4/1996 | Neeves et al. | |
| 5,583,683 A | 12/1996 | Scobey | |
| 5,615,289 A | 3/1997 | Duck et al. | |
| 5,646,399 A | 7/1997 | Fukushima et al. | |
| 5,712,717 A | 1/1998 | Hamel et al. | |
| 5,754,718 A | 5/1998 | Duck et al. | |
| 5,812,291 A | * 9/1998 | Bendelli et al. | 359/129 |
| 5,966,987 A | * 10/1999 | Yoon et al. | 250/226 |
| 6,043,922 A | * 3/2000 | Koga et al. | 359/578 |

FOREIGN PATENT DOCUMENTS

| | | | | |
|---|---|---|---|---|
| EP | 608900 A1 | * 8/1994 | | 359/579 |
| JP | 55-151830 | * 11/1980 | | 359/127 |
| JP | 56-112136 | * 9/1981 | | 359/114 |
| JP | 58-009119 | * 1/1983 | | |
| JP | 0128032 | * 5/1989 | | 359/579 |
| JP | 06-331850 A | * 12/1994 | | |

* cited by examiner

Primary Examiner—Cassandra Spyrou
Assistant Examiner—John Juba, Jr.
(74) Attorney, Agent, or Firm—Alston & Bird LLP

(57) ABSTRACT

An apparatus and associated method are provided to compensate for temperature-induced drift in the center wavelength of an optical filter, such as an interference filter or an etalon filter. Interference filters can be used to filter out one among a number of narrow, closely-spaced channels in an optical wavelength division multiplexed (WDM) communications system. Etalon filters can be used to lock the output wavelength of distributed feedback lasers and in other related applications. The center wavelength of interference filters and etalon filters changes with both temperature and the angle of incidence of the optical beam. The apparatus and associated method of the invention use a positioner with a different coefficient of thermal expansion to adjust the angle of incidence of the filter as the temperature changes, thereby offsetting the temperature-induced center wavelength change. The invention provides temperature-compensated optical filter assemblies, add-drop multiplexers, optical networking systems, and associated methods.

9 Claims, 4 Drawing Sheets

TEMPERATURE-COMPENSATED OPTICAL FILTER ASSEMBLIES AND RELATED METHODS

FIELD OF THE INVENTION

This invention relates generally to optical filters for optical communications networks and add-drop multiplexers and optical networking systems based on interference filters and, more particularly, to interference filters and etalon filters with temperature compensation to adjust for filter center wavelength drift over temperature.

BACKGROUND OF THE INVENTION

Fiber optic cable finds widespread use in data transmission and other telecommunications applications that take advantage of the inherently large bandwidth available with fiber optics. There is a significant installed base of fiber optic cable criss-crossing much of the developed world, but the capacity of that installed base is being increasingly stretched as demand for communications network capacity surges. Fortunately, recent advances in optical signal processing have increased the number of optical signal channels that may be carried by a single fiber optic strand and have reduced the need to install expensive new fibers by greatly increasing the communications capacity of existing fibers. One of these optical signal processing advances is wavelength division multiplexing (WDM), which allows multiple optical channels, each at a different wavelength, to be carried over a single fiber optic strand. In WDM, carrier signals at different channel wavelengths are combined onto or extracted from a single strand of optical fiber capable of propagating the full range of channel wavelengths. WDM uses multiplexers and other filter-based signal processing components to provide the wavelength-selective channel combining and extracting functions.

Optical signal processing components known as interference filters are based on the principle of multiple-beam interference and can be constructed by depositing multiple thin layers of dielectric film on a silica or other substrate. Recent advances in dielectric film deposition technology and precise in-situ control of deposition have enabled the fabrication of interference filters for demanding dense WDM (DWDM) applications with narrow signal channels and close channel spacing.

Etalon filters are employed in a number of optical applications, including for wavelength locking of distributed feedback lasers and other narrow-output lasers and for adjustment of Fabry-Perot interferometers. In a laser wavelength locking application, a sample of the laser output is directed to an etalon filter tuned to the desired center wavelength of the laser. The optical energy both transmitted through and reflected from the etalon filter is measured, and the ratio of those two measurements indicates the extent to which the laser output has departed from the desired center wavelength. The ratio signal can be used in a feedback loop to control laser bias current or another laser control parameter that controls the output wavelength of the laser.

An etalon filter can be constructed by forming mirrors on each side of a dielectric spacer. The spacer can be a wafer of silicon, zinc sulfide or zinc selenide, for example. The mirrors can be formed of quarter wavelength layer pairs of dielectric films of high and low refractive index material. In operation, the center wavelength of the etalon filter may be tuned by adjusting its position relative to the angle of incidence of an incident collimated optical beam. Unfortunately, the center wavelength of an etalon filter changes with temperature, and the temperature performance of a laser output locking circuit or interferometer stabilization circuit based on an etalon filter is accordingly degraded.

In many applications it is advantageous to be able to tune the center wavelength of an interference filter or an etalon filter. For example, tuning mechanisms have been developed that take advantage of the fact that the center wavelength of an interference filter is reduced as the angle of incidence of the optical beam is moved away from the normal to the filter surface. FIG. 1 indicates that the center wavelength of a typical interference filter changes by a few percent as the angle of incidence changes from the normal through an angle of 40 or 50 degrees from the normal. Tunable interference filters that permit adjustment of the angle of incidence are disclosed in U.S. Pat. No. 5,481,402 to Cheng et al. ("Cheng") and in European Pat. Appln. No. EP 0733921A2 to Bendelli et al. ("Bendelli"). A tunable interference filter according to Bendelli is illustrated in FIG. 2.

Newer DWDM systems combine and extract an even larger number of narrower, more closely-spaced channels onto a single fiber strand. For example, each channel may have a bandwidth of only 0.2 nm and adjacent channels may be separated by only 0.4 nm, and DWDM interference filter performance requirements are accordingly stringent. Unfortunately, interference filters in DWDM applications may have unacceptable temperature performance: as the temperature of the interference filter increases, the refractive index of the dielectric layers change and the center wavelength of the filter drifts accordingly. For the narrow channel widths and close channel spacings of DWDM systems, this drift may be unacceptable. FIG. 3 shows the dependence of the center wavelength on temperature for a typical interference filter. The temperature dependence of the center wavelength of a typical multi-layer DWDM interference filter is roughly 0.004 nm/deg C., so a temperature change of 50 deg C. will change the center wavelength of a DWDM interference filter by about 0.2 nm. For DWDM applications with channel separation as small as 0.4 nm and filter bandwidths of as narrow as 0.2 nm, such a center wavelength shift is obviously unacceptable, so a temperature compensation mechanism is needed. Similarly, the center wavelength of an etalon filter used to lock a laser or stabilize an interferometer may drift unacceptably as a function of temperature. Unfortunately, the manually tunable filters of Cheng and Bendelli do not permit compensation for temperature changes without manual intervention. Manual tuning to compensate for temperature is impractical for fiber communications equipment deployed in the field.

One conventional approach to overcoming the aforementioned problem of center wavelength or resonance wavelength drift with temperature is to actively control the temperature of the DWDM interference filter assembly or etalon filter. Active temperature control techniques are widely used in a variety of electronics applications. These techniques generally employ thermistors to measure the temperature of the device, heaters or thermoelectric coolers to control the temperature of the device, and control electronics to control the heaters or coolers based on feedback from the thermistors. Unfortunately, active temperature control schemes are bulky and expensive and consume large amounts of power.

In summary, interference filters shift over temperature and may therefore provide unacceptable performance in many DWDM applications with stringent channel selectivity requirements. Active temperature control techniques are conventionally employed to overcome these performance limitations, but an unacceptably heavy penalty is paid in cost, weight, power consumption, and reliability.

SUMMARY OF THE INVENTION

According to one aspect of the present invention, a temperature-compensated electronic equipment is provided, such as an optical filter assembly for filtering optical signals from an optical beam. The assembly compensates for temperature-induced changes in filter performance, particularly in dense wavelength division multiplexing applications characterized by narrow, closely-spaced optical signal channels. The assembly includes a frame having two spaced-apart ports for applying optical signals, an optical filter pivotally mounted to the frame between the first and second ports, and a positioner mounted to the frame and in engagement with the optical filter. The positioner is formed of a material that has a coefficient of thermal expansion different from that of the frame material. The positioner is constructed and arranged to move the optical filter in response to changes in the temperature of the frame, thereby compensating for changes in the frequency characteristics of the optical filter over temperature.

According to another aspect of the invention, a method of compensating for temperature-induced changes in the frequency characteristics of an optical filter assembly is provided. The method includes the steps of providing a frame with spaced-apart first and second optical ports, positioning an interference filter between the optical ports, and moving the interference filter to adjust the frequency characteristics of the interference filter in response to changes in the temperature of the frame.

The apparatus and methods of the present invention provide temperature compensation for optical filters and other electronic equipment, such as interference filters and etalon filters, by adjusting the angle of incidence of an optical signal relative to the optical filter as the temperature of the apparatus changes. This adjustment to the angle of incidence shifts the center wavelength of the filter and offsets a countervailing center wavelength shift in the filter induced by the temperature change. According to one aspect of the invention, dense wavelength division multiplexed (DWDM) optical signal processing equipment may thus provide improved performance while operating over a range of temperatures.

BRIEF DESCRIPTION OF THE DRAWINGS

FIG. 7 is a top view of a temperature-compensated etalon filter assembly including a positioner and movable filter according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 3:
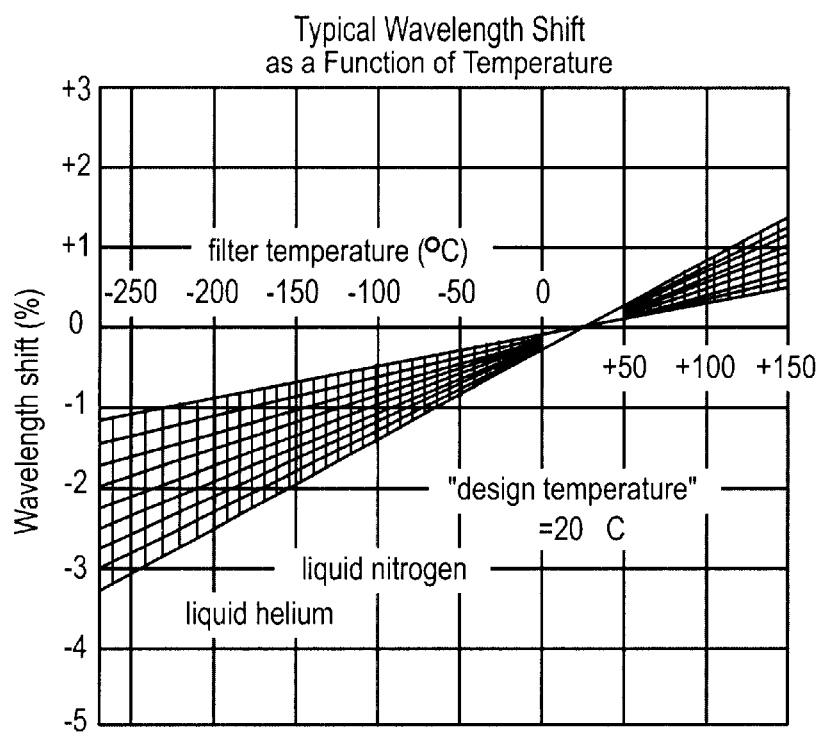
FIG. 3 is a graph of center wavelength shift as a function of temperature for a typical interference filter.

It is one object of the present invention to mitigate the dependence of the operating characteristics of an electronic equipment on temperature. (The phrase "electronic equipment," as used herein, refers to any member of the broad class of equipment that processes electronic or optical signals; "optical equipment" is a subset of "electronic equipment" as those phrases are used herein.) For example, in one advantageous embodiment of the present invention the temperature dependence of the center wavelength of an optical filter, such as an interference filter, is reduced so that such filters may provide acceptable performance, such as in demanding DWDM applications requiring stringent channel selectivity. As shown by the graph of FIG. 3, as the temperature of an interference filter increases, the center wavelength increases. According to one embodiment of the present invention, a temperature compensation mechanism is provided to offset the increase in center wavelength over a wide range of temperatures.

The angle of incidence of light on a multi-layer dielectric interference filter determines the filter's center wavelength. The background discussion above in connection with the graph of FIG. 1 indicated that as the angle of incidence of a collimated optical beam on the filter is increased or decreased about an initial set point, the center wavelength changes accordingly. In one embodiment of the prior art, the initial angle is set to approximately twelve degrees. As discussed above, the graph of FIG. 3 indicates the dependence of the center wavelength of the same interference filter on temperature.

According to one advantageous embodiment of the present invention, an apparatus is provided whereby an increase in the temperature of the apparatus produces a decrease in the angle of incidence of the light on the filter and compensates for the increase in center wavelength produced by the temperature increase.

Figure 4:
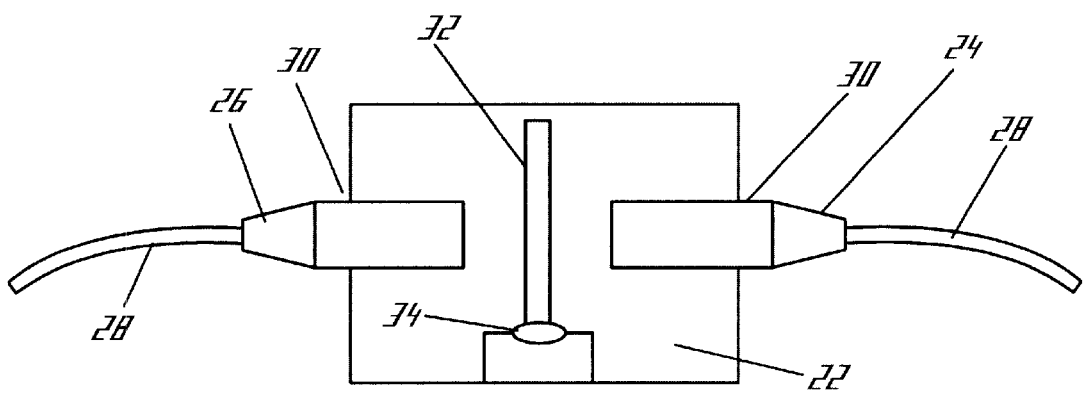
FIG. 4 is a top view of a conventional (prior art) uncompensated interference filter assembly.

A schematic diagram of a conventional (prior art) interference filter assembly, without the temperature compensation of the present invention, is provided in FIG. 4. The conventional (uncompensated) assembly includes a frame 22 on which two collinear optical ports 24, 26 fed by fiber optic cables 28 are mounted. Graded-index ("GRIN") rods 30 are mounted at each of the optical ports 24, 26 to collimate the optical beam emerging from the fiber optic cables 28. In a typical DWDM application, the optical beams includes a number of closely-spaced, narrow optical channels, each of which typically carries an information signal.

In the prior art interference filter assembly of FIG. 4, an interference filter 32 is mounted between the GRIN rods 30 offset slightly from the normal to the direction of light propagation by a set amount, such as by twelve degrees. The interference filter 32 is typically a band-pass structure consisting of a substrate upon which a number of alternating layers of very thin dielectric material have been deposited.

The thickness and dielectric constants of the alternating layers are typically chosen to be approximately one-quarter wavelength at the wavelength to be passed by the filter. With a large number of thin layers and with very careful control of dielectric constant and dielectric thickness, a high-selectivity optical filter may be constructed that can discriminate among a number of closely-spaced channels simultaneously carried on a single optical beam.

In order to filter out the desired optical channel from the collimated optical beam, the interference filter 32 in the conventional assembly of FIG. 4 is carefully positioned between the two GRIN rods 30 so that the angle of incidence of the collimated optical beam provides the desired filter passband. The relationship between the angle of incidence and the filter passband is discussed above in connection with FIG. 1. The interference filter is then bonded into position with glue 34 or other bonding means. Unfortunately, the conventional interference filter assembly of FIG. 4 provides unacceptable performance over temperature in DWDM applications where precise selectivity is required from among a number of narrow, closely-spaced channels.

Figure 5:
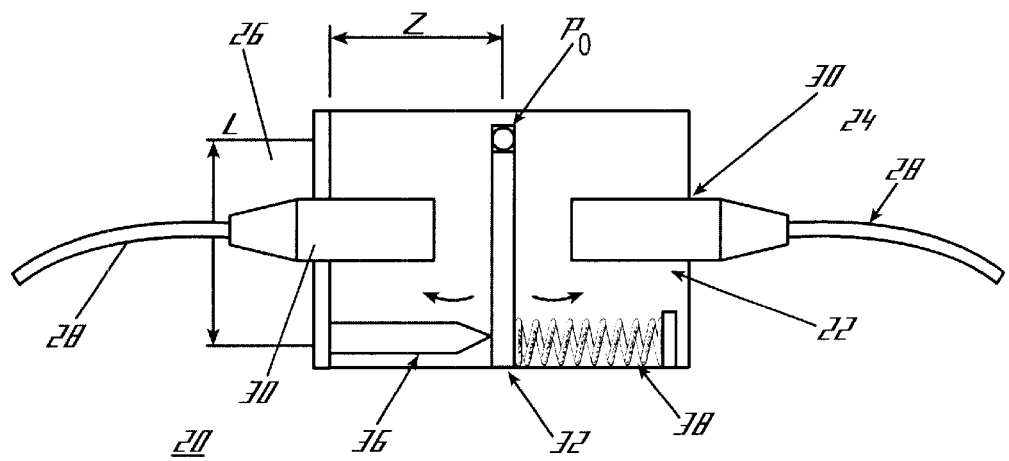
FIG. 5 is a top view of a temperature-compensated interference filter assembly including a positioner and movable filter according to one embodiment of the present invention.

A schematic diagram of a temperature compensated interference filter assembly 20 according to one embodiment of the present invention is provided in FIG. 5. A frame 22 includes first and second ports 24, 26 for applying optical signals. The first and second ports 24, 26 are preferably collinear and may be fed by one or more fiber optic cables 28, such as fiber optic pigtails. Each of the ports preferably includes a GRIN rod 30 or other collimating optics to collimate an optical beam emerging from the fiber optic cables. The fiber optic cables 28 preferably connect to the first and second ports 24, 26 through fiber optic connectors, as is known in the art. Other equipment for delivering optical signals and for forming a substantially collimated beam as is known in the art may employed without departing from the present invention. Without departing from the present invention, three- or four-port optical equipment, in addition to the two-port interference filter assembly described in detail herein, may be employed.

Figure 1:
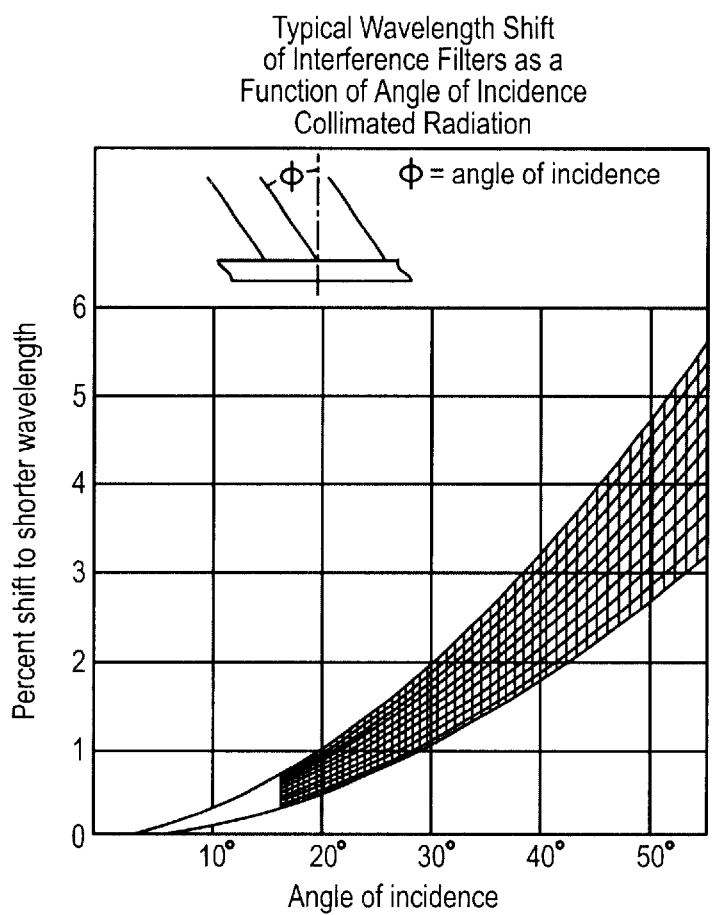
FIG. 1 is a graph of center wavelength shift as a function of angle of incidence for a typical interference filter.
Figure 2:
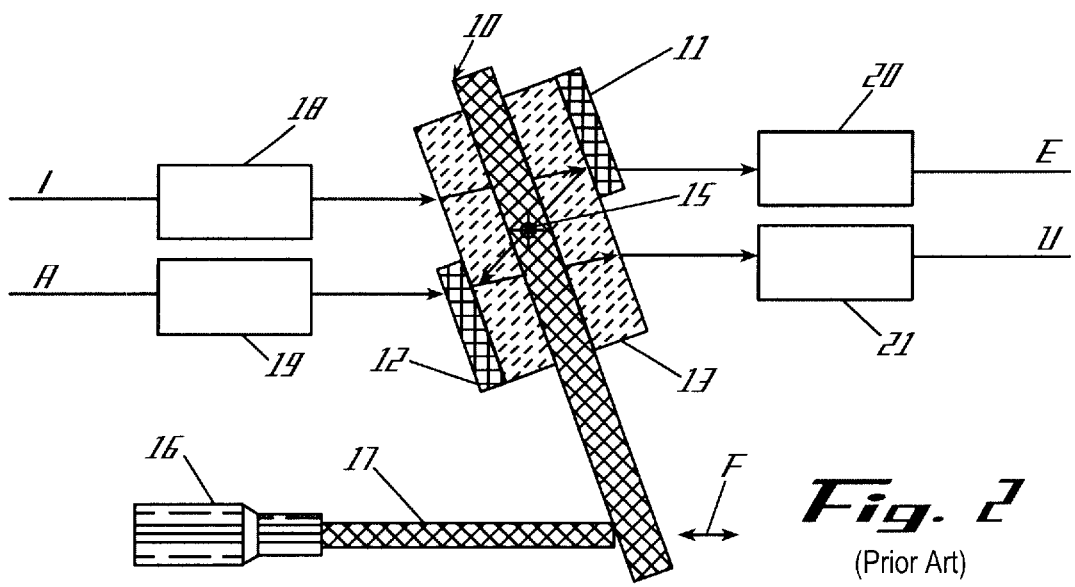
FIG. 2 is a top view of a prior art add-drop multiplexer including a wavelength tuning mechanism.

In the embodiment depicted in FIG. 5, the interference filter 20 is positioned between the GRIN rods 30 at the first and second ports 24, 26. According to one advantageous embodiment, means are provided for moving the interference filter 32 relative to the first and second ports 24, 26 in response to changes in the temperature of the interference filter assembly 20. Such moving means may comprise, for example, having one end of the interference filter 32 pivotally mounted to the frame 22 by pin Po so that the interference filter 32 is free to swing through some portion of the space between the GRIN rods 30 and so that the angle of incidence of the collimated optical beam on the filter 32 may be varied somewhat. In one embodiment, one end of a positioner 36, such as a rigid standoff, is secured to the frame 22, and the free end of the positioner 36 contacts the free end of the interference filter 32. In one embodiment, the positioner 36 comprises a threaded screw so that manual tuning of the filter center wavelength may be accomplished, such as at the time of the initial setup or installation of the interference filter 20. The positioner 36 is preferably constructed from a material that has a coefficient of thermal expansion different from that of the material from which the frame 22 is constructed. For example, the material of the frame 22 in FIG. 5 may be chosen to have a lower thermal expansion coefficient than the material of the positioner 36. Because of the difference in the thermal expansion coefficients of the frame 22 and the positioner 36, a change in temperature of the assembly 20 will cause the angle of incidence of the optical beam on the interference filter 32 to change. The displacement of the positioner 36 relative to the frame 22 causes an angular tilt in the interference filter 32 and changes the angle of incidence of the optical beam on the filter 32 as defined by Equation (1) below:

$$\tan^{-1}(z(\alpha_b - \alpha_s)\Delta T/L), \tag{1}$$

where $\Delta T$ is the temperature change, z and L are distances shown in FIG. 5, and $\alpha_b$ and $\alpha_s$ are the coefficient of thermal expansion of the frame 22 and the positioner 36, respectively. The change of the filter center wavelength as a function of temperature in the assembly according to this advantageous embodiment of the invention can therefore be expressed by Equation (2) below:

$$\Delta\lambda = -|\gamma(\theta_o)| \cdot \tan^{-1}(z(\alpha_b - \alpha_s)\Delta T/L) + \eta \cdot \Delta T, \tag{2}$$

where $\gamma(\theta_o)$ is the change in center wavelength of the interference filter 32 per unit angle at an angle $\theta_o$ (a preset angle such as twelve degrees), such as would be determined for a particular filter by a graph such as that of FIG. 1, and $\eta$ is the temperature coefficient of the center wavelength, such as would be determined for a particular filter by a graph such as that of FIG. 3. Since $\gamma$ and $\eta$ are known for a given interference filter 32, it is straightforward to choose $\alpha_b$, $\alpha_s$, z, and L for an assembly so that the total wavelength change for the filter is minimized over a given operating temperature range.

As shown in FIG. 5, the interference filter assembly 20 according to one advantageous embodiment of the present invention includes means for biasing the filter 32 against the positioner 36 to thereby ensure contact between the interference filter 32 and the positioner 36. Such biasing means may comprise a compressed spring 38 mounted to the frame 22 and in contact with the interference filter 32, or it may comprise other biasing means known in the art.

Figure 6:
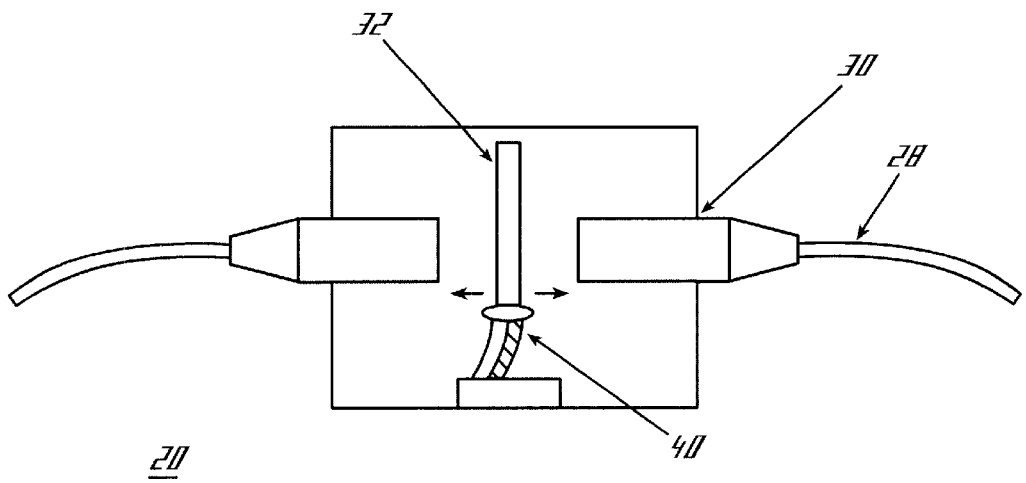
FIG. 6 is a top view of a temperature-compensated interference filter assembly including a bi-metallic filter positioner according to one embodiment of the present invention.
Figure 1:
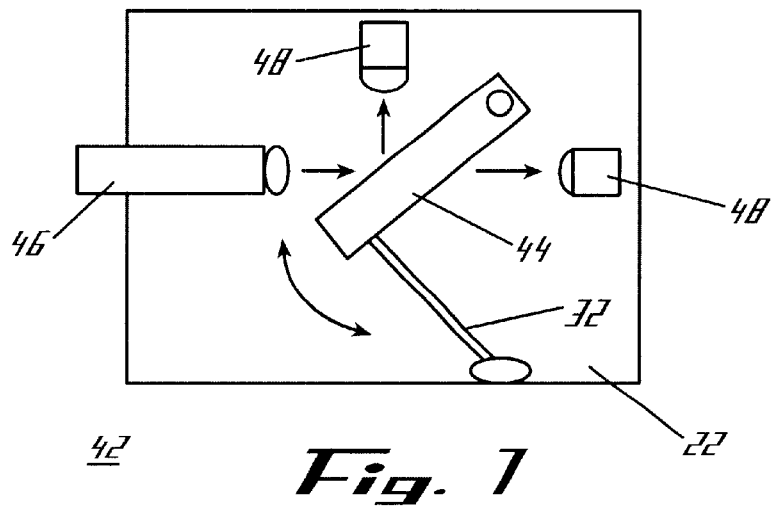

A temperature-compensated interference filter assembly according to another advantageous embodiment of the present invention is shown in FIG. 6. In this embodiment, a bi-metallic plate 40 is constructed and arranged adjacent the interference filter 32 to move the interference filter 32 in response to changes in the temperature of the assembly 20. It is fairly straightforward for one skilled in the art to design a bi-metallic plate 40 by choosing the thickness and coefficient of thermal expansion of the two metals such that as the temperature changes, the bi-metallic plate 40 bends at a predetermined rate. If the interference filter 32 is mounted adjacent the bi-metallic plate 40 at an appropriate location, the angle of incidence of the optical beam with the interference filter 32 will change at a rate required to offset the filter center wavelength change over temperature. The net change in filter center wavelength can thereby be minimized as a function of temperature.

According to another advantageous embodiment of the present invention, a temperature-compensated etalon filter assembly 42 is provided as shown in FIG. 7. As described above, the center wavelength of an etalon filter 44 changes as the angle of incidence of the incident optical beam, such as from a laser 46, changes. A positioner 32 functionally similar to the positioner structure described above in connection with temperature-compensated interference filters is provided. According to one advantageous embodiment, an etalon filter 44 is pivotally mounted to a frame 22 formed of a first material and is in engagement with a positioner 32 formed of a second material. Detectors 48 detect the optical energy reflected by and transmitted through the etalon filter 44, indicating the extent to which the wavelength of laser 46 has drifted. The etalon filter assembly 42 is temperature-compensated by virtue of the positioner 32 moving the etalon filter 44 in response to changes in the temperature of the etalon filter assembly 42. In one embodiment, a biasing means, such as a compressed spring, is employed to ensure contact between the positioner 32 and the etalon filter 44.

According to another aspect of the present invention, a temperature-compensated add-drop multiplexer, incorporating a temperature-compensated interference filter assembly as described above, is provided for multiplexing and demultiplexing optical signals. According to yet another aspect of the present invention, an optical networking system, incorporating a temperature-compensated interference filter assembly as described above, is provided for processing and distributing optical signals.

Figure 8:
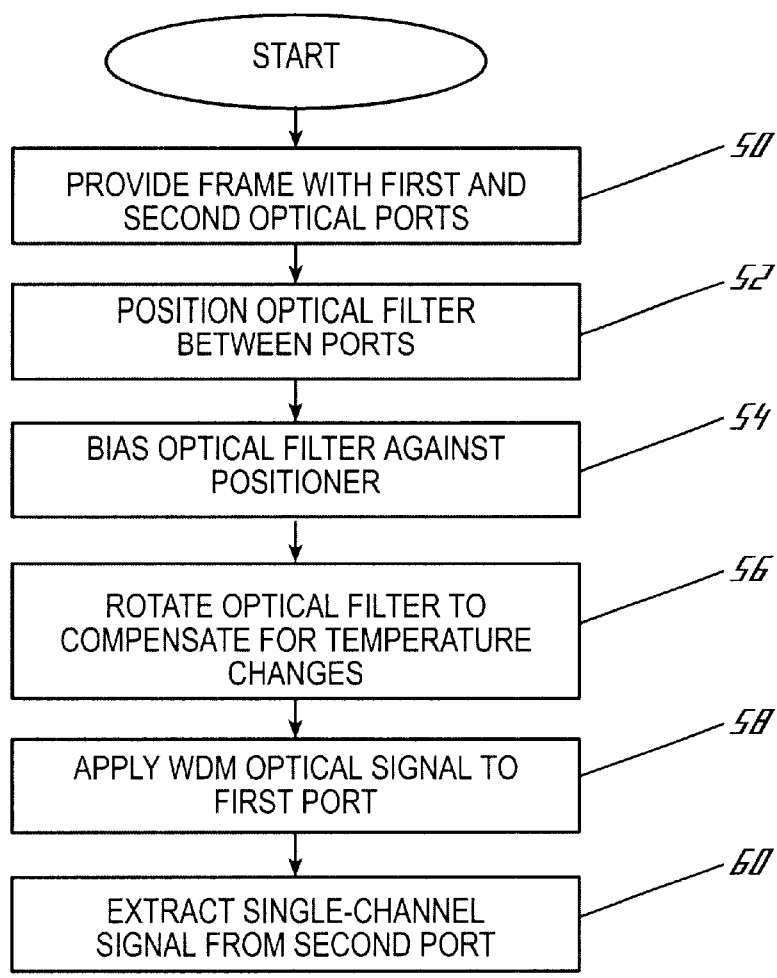
FIG. 8 is a flow diagram presenting the steps in a method of compensating for temperature-induced changes in the frequency characteristics of an optical filter assembly according to one embodiment of the present invention.

A method of compensating for temperature induced changes in the frequency characteristics of an optical filter assembly is provided according to one aspect of the present invention. In one advantageous embodiment illustrated by the flow diagram of FIG. 8, the method includes the steps of providing a frame comprising first and second optical ports, as indicated by block 50, positioning an optical filter between the ports, as indicated by block 52, biasing the optical filter against a positioner, as indicated by block 54, and moving the optical filter to thereby adjust the frequency characteristics of the optical filter in response to changes in the temperature of the optical filter assembly, as indicated by block 56. If desirable, the method may further include the steps of applying a WDM optical signal to the first port, as indicated by block 58, and extracting a single-channel optical signal from the second port, as indicated by block 60.

The apparatus and methods of the present invention thus provide temperature compensation for optical filters, such as interference filters and etalon filters, by adjusting the angle of incidence of an optical signal on the optical filter 32 as the temperature of the apparatus changes. As discussed above, this adjustment to the angle of incidence shifts the center wavelength of the filter and offsets a countervailing center wavelength shift in the filter that is induced by the temperature change. According to one aspect of the invention, dense wavelength division multiplexed (DWDM) optical signal processing equipment may thus provide improved performance while operating over a range of temperatures.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A temperature-compensated interference filter assembly for filtering optical signals, the assembly comprising:

a frame comprising spaced-apart first and second ports that apply optical signals;

an interference filter pivotally mounted to the frame between the first port and the second port; and means for moving the interference filter relative to the first and second ports in response to changes in the temperature of the interference filter assembly to thereby compensate for temperature-induced changes in the frequency characteristics of the interference filter, wherein the moving means comprises a bi-metallic plate constructed and arranged adjacent the interference filter.

2. The temperature-compensated interference filter of claim 1 further comprising a graded-index (GRIN) rod mounted at each of the first and second ports for collimating an optical beam.

3. The temperature-compensated interference filter of claim 1 wherein the interference filter is an etalon interference filter.

4. A temperature-compensated add-drop multiplexer for multiplexing and demultiplexing optical signals, the add-drop multiplexer comprising:

a frame comprising spaced-apart first and second ports for applying optical signals;

an interference filter pivotally mounted to the frame between the first port and the second port; and means for moving the interference filter relative to the first and second ports in response to changes in the temperature of the add-drop multiplexer to thereby compensate for changes in the frequency characteristics of the add-drop multiplexer over temperature, wherein the moving means comprises a bi-metallic plate constructed and arranged adjacent the interference filter.

5. A temperature-compensated add-drop multiplexer of claim 4 wherein the interference filter is an etalon interference filter.

6. The temperature-compensated add-drop multiplexer of claim 4 further comprising a graded-index (GRIN) rod mounted at each of the first and second ports for collimating an optical beam.

7. An optical network system for processing and distributing optical signals, the system comprising:

a frame comprising spaced-apart first and second ports for applying optical signals;

an interference filter pivotally mounted to the frame between the first port and the second port; and means for moving the interference filter relative to the first and second ports in response to changes in the temperature of the interference filter assembly to thereby compensate for temperature-induced changes in the frequency characteristics of the interference filter, wherein the moving means comprises a bi-metallic plate constructed and arranged adjacent the interference filter.

8. An optical network system for processing and distributing optical signals of claim 7 wherein the interference filter is an etalon interference filter.

9. The optical network system of claim 7 further comprising a graded-index (GRIN) rod mounted at each of the first and second ports for collimating an optical beam.

* * * * *